(No Model.) 7 Sheets—Sheet 1.

F. F. ELLIS.
MACHINE FOR MAKING WIRE RINGS.

No. 500,058. Patented June 20, 1893.

Fig. 1.

WITNESSES:
H. A. Carhart
G. M. Blowers

INVENTOR
Ferguid F. Ellis
by Smith & Denison
his ATTORNEYS.

(No Model.)  7 Sheets—Sheet 2.

F. F. ELLIS.
MACHINE FOR MAKING WIRE RINGS.

No. 500,058.  Patented June 20, 1893.

WITNESSES:
H. A. Carhart
G. M. Blowers

INVENTOR
Ferraud F. Ellis
by Swift & Denison
his ATTORNEYS.

THE NORRIS PETERS CO., PHOTO-LITHO., WASHINGTON, D. C.

(No Model.) 7 Sheets—Sheet 5.
F. F. ELLIS.
MACHINE FOR MAKING WIRE RINGS.

No. 500,058. Patented June 20, 1893.

WITNESSES:

INVENTOR

Fernand F Ellis
by Smith & Denison
his ATTORNEYS.

(No Model.) 7 Sheets—Sheet 6.

F. F. ELLIS.
MACHINE FOR MAKING WIRE RINGS.

No. 500,058. Patented June 20, 1893.

WITNESSES:

INVENTOR
Ferrand F. Ellis
by Smith & Denison
his ATTORNEYS.

(No Model.) 7 Sheets—Sheet 7.

F. F. ELLIS.
MACHINE FOR MAKING WIRE RINGS.

No. 500,058. Patented June 20, 1893.

WITNESSES:
H. A. Carhart,
G. M. Blowers,

INVENTOR
Ferrand F. Ellis
by Smith & Denison
his ATTORNEYS.

THE NORRIS PETERS CO., PHOTO-LITHO., WASHINGTON, D. C.

UNITED STATES PATENT OFFICE.

FERRAND F. ELLIS, OF ONEIDA, ASSIGNOR TO THE ONEIDA COMMUNITY, LIMITED, OF KENWOOD, NEW YORK.

MACHINE FOR MAKING WIRE RINGS.

SPECIFICATION forming part of Letters Patent No. 500,058, dated June 20, 1893.

Application filed October 28, 1892. Serial No. 450,241. (No model.)

*To all whom it may concern:*

Be it known that I, FERRAND F. ELLIS, of Oneida, in the county of Madison, in the State of New York, have invented new and useful Improvements in Machines for Making Rings, of which the following, taken in connection with the accompanying drawings, is a full, clear, and exact description.

My invention relates to machines for making rings from a coil of wire, in which the wire is fed, cut off to length, bent to form the incomplete ring, and the ends of the wire are bent, or wrapped each around the other to tie said ends and form the knot which secures them together.

My object is to produce a machine for making rings from wire, which is fed into the machine from the coil, is cut off, bent to form the incomplete ring with the ends of the wire over-lapping and alongside of each other, which ends are then bent transversely to and across each other in opposite directions, and are then wrapped or coiled in opposite directions each around the body of the wire adjacent to the other end, each and every of which operations is effected in turn by separate cam-actuated mechanisms, said cams being mounted upon a single drive-shaft common to all, and each operating a lever mechanism.

My invention consists in the several novel features of construction and operation hereinafter described and which are specifically set forth in the claims hereunto annexed. It is constructed as follows, reference being had to the accompanying drawings, in which—

A—, is the bed of the machine provided with suitable supports. The drive-shaft —$a$— is journaled upon the bed.

—$a'$— is the drive-pulley or pulleys; and —$a''$— is the drive pinion meshing with the driven gear —$b$—, mounted upon the main shaft —$b'$— which is also journaled in bearings above the bed.

Upon the main shaft, the feed-cam —$c$—, the winder shifting cams —$d$—, the winder rotating cams —$e$—$e'$— (one of which also actuates the cut-off), and the bending-cam —$h$— and tucking-cam —$k$— are mounted and are rotated by it.

Figure 3:
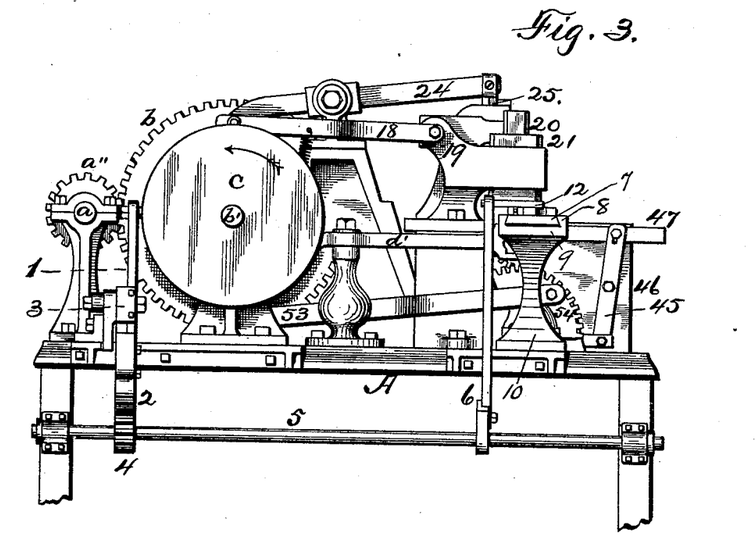
Fig. 3 is a like view of the other end.

The feed mechanism comprises the cam —$c$—, grooved as shown, and with which the upper end of the lever —1— (Figs. 1 and 3) engages, the geared sector —2— on the lower end of said lever, said lever being pivoted at —3—, said sector meshing with the pinion —4— upon the shaft —5— provided with an arm —6—, the upper end of which is connected to the slide —7— mounted in ways —8— upon the feed-table —9—, carried by the standard —10—; and said slide is provided with a gripping-cam dog —11— pivotally mounted, and the arm —12— to which the arm —6— is connected, is connected to said dog. Then the rotation of the feed-cam will, through said lever, sector and pinion, oscillate said shaft and swing said arm —6— forward and back, which will reciprocate said slide, and as it is moved to the right in Fig. 1, the strain will swing the dog 11 upon its pivot and cause it to firmly grip the wire —13—, which is led from the coil (not shown) through the straightener —14—, of any ordinary construction, and said slide will thus feed the wire into the machine; and as the slide is moved to the left, the grip of the cam-dog will be broken and the slide will move back, released from the wire. The feed-table is also provided with a dog —15— which engages with the wire to prevent its being pulled back by the reverse movement of said slide, while freely permitting the forward feed of said wire. The tension of the dog —15— upon the wire may be varied by shifting the dog-arm —16— in the notches in the bar—17—.

Figure 4:
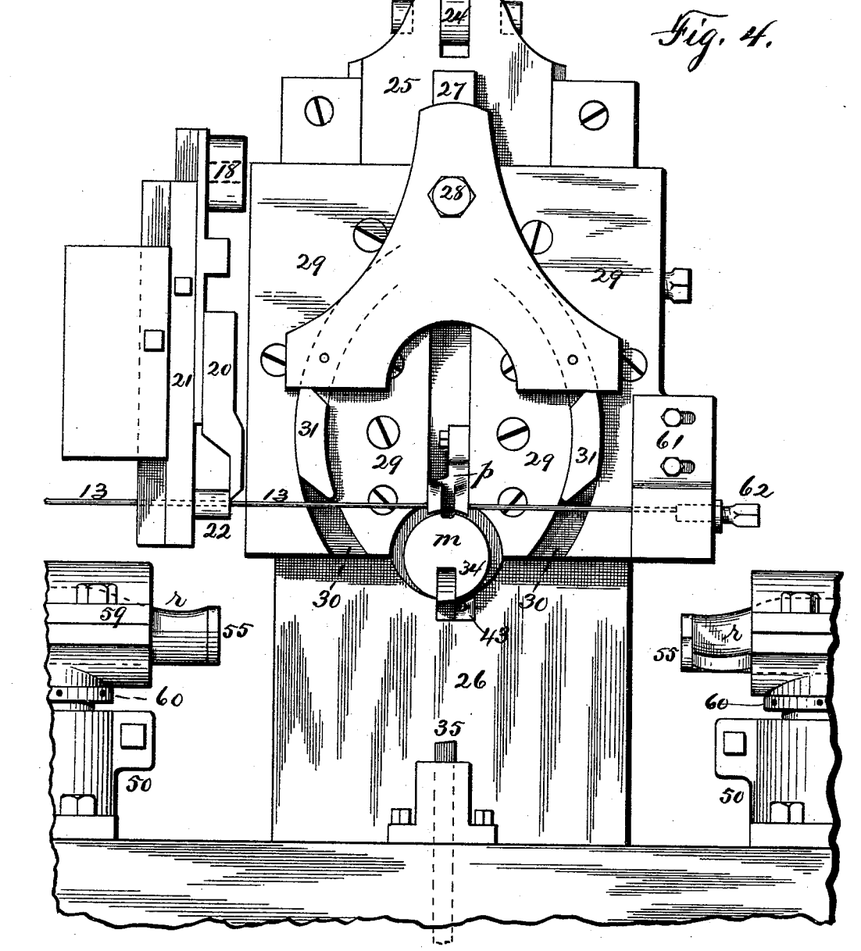
Fig. 4 is a front elevation, showing the benders raised to permit the wire to be fed, and showing it fed and ready to be cut off.
Figures 5, 20, 21:
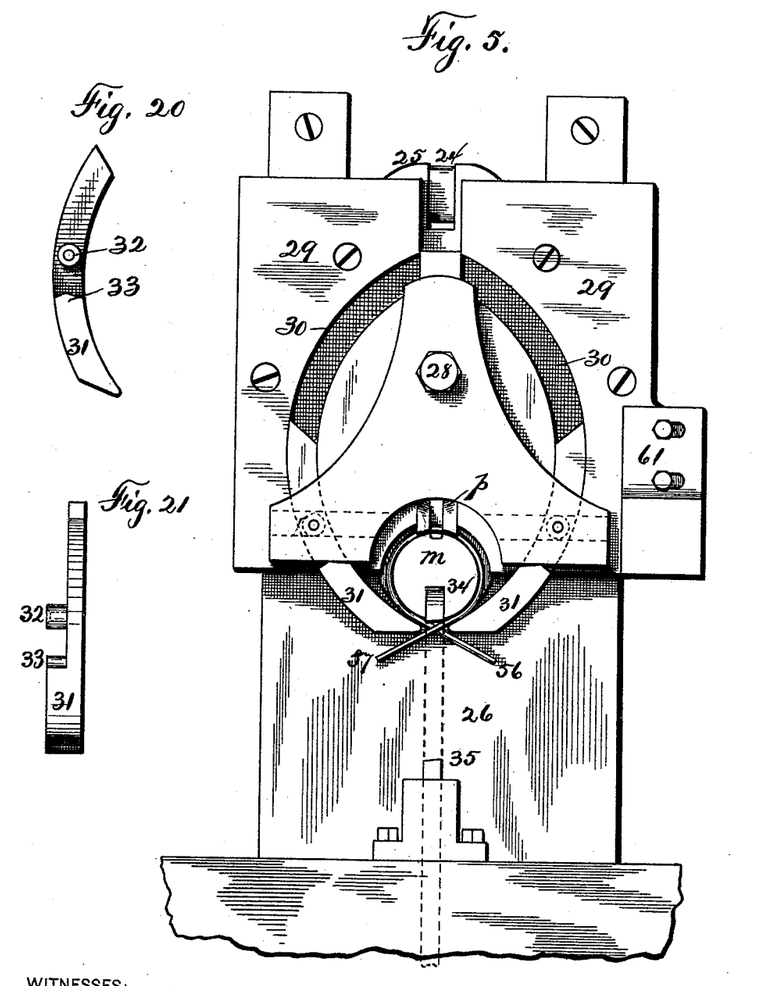
Fig. 5, is a like view of part of said front, showing the benders lowered and the wire bent around the mandrel to form the incomplete ring.
Figs. 20 and 21, are, respectively, a front and an edge view of one of the bending fingers, detached.
Figure 6:
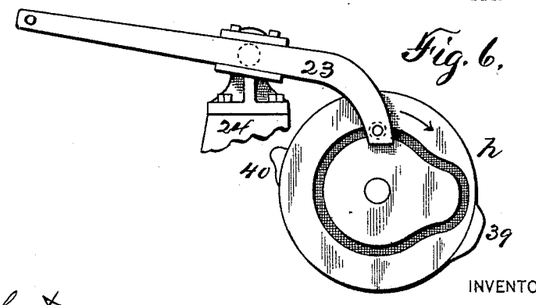
Fig. 6, is a detail in side elevation of the bending cam and lever.
Figure 7:
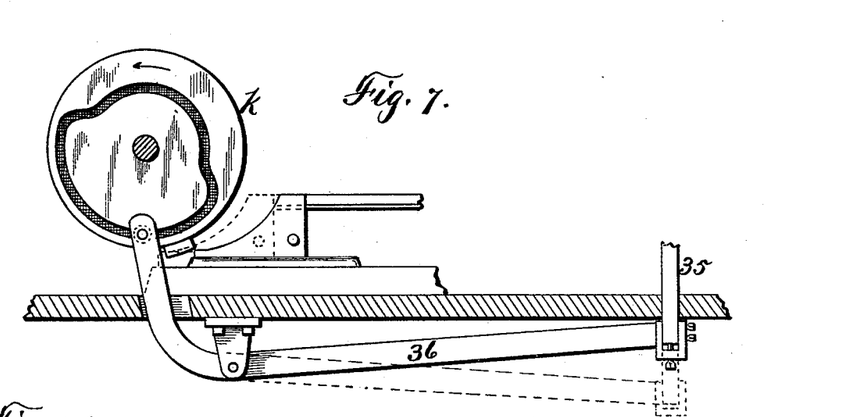
Fig. 7, is a detail in side elevation of the cam lever for operating the vertically movable grip jaw.
Figure 10:
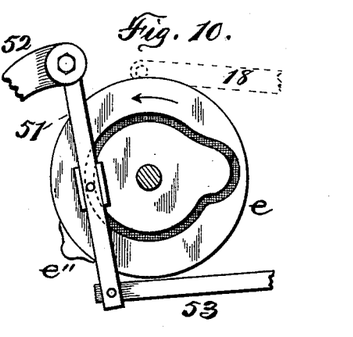
Figure 11:
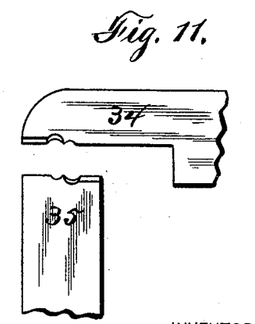
Fig. 11, is a detail of the stationary and the movable grip jaws, separated.

The cut-off mechanism comprises the cam —e— provided with lug —e″—, which (Figs. 1, 4 and 10) with the rotation of the cam, engages with the free end of the angular lever —18—, pivoted in a bearing —19—, and at the front end pivotally connected to a vertically movable cut-off —20—, mounted in ways in the vertically adjustable slide —21—, which is provided with a wire-guide-tube —22—, which also serves as an abutment when the cut-off is operated to sever the wire. When the wire is fed in, as shown in Fig. 4, the rotation of said cam and the engagement of the lug with the lever, raises the rear end thereof and forces the front end and the cut-off down and severs the wire. The bending mechanism forms the incomplete link, from the piece of wire so severed, and comprises the cam —h— grooved in its face as shown in Fig. 6, the lever —23— pivoted upon a standard —24— erected upon the bed, and having its front end connected to the vertically movable slide —25— (Figs. 4 and 5) mounted in ways in the standard —26— and slotted vertically as at —27—, through which slot the bolt —28— passes, which adjustably secures the front section of said slide to the rear section thereof; the face-plate —29— provided with the curved grooves —30— in which the cam fingers —31— fit loosely, said fingers being each provided with a stud —32— by which each is pivotally connected to the slide, and with shoulders —33— which bear against the bottom of the slide. Then when the cam rotates, the lever forces the slide down, and the fingers from their curvature are swung toward each other, and engaging with the wire, as in Fig. 4, they bend it around the mandrel —m— as in Fig. 5 with the ends over-lapping and crossed under the stationary jaw —34— of the gripping mechanism, the wire lying in the notches therein (see Fig. 11). The link-gripping mechanism comprises this stationary jaw, the vertically reciprocating jaw —35— (Figs. 4, 5 and 7) carried by the front end of the angular lever —36— pivoted beneath the bed, and extending upward through it and engaging with the cam —k—, the swing of said lever being shown by the dotted lines in Fig. 7, and the mechanism being so timed that the jaw —35— is brought up and grips the incomplete link just before the fingers are retracted, the wire lying partly in the notches therein, shown in Fig. 11.

When the wire is fed into the machine, it passes through a notch (Fig. 8) in the lug or lugs —p— (Figs. 4 and 5) mounted upon the face-plate —29—, and when the lower part of the incomplete link is gripped, as aforesaid, the upper part thereof is held by said lug or lugs. The mandrel —m— is grooved longitudinally to receive the body of the stationary jaw —34—, and is also adapted to traverse said jaw-body, and is reciprocated by the following mechanism.

Figure 2:
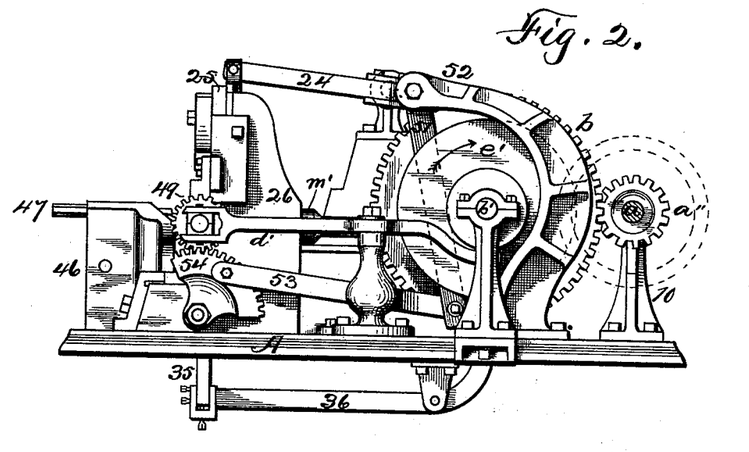
Fig. 2 is a side elevation of one end of the machine.
Figure 8:
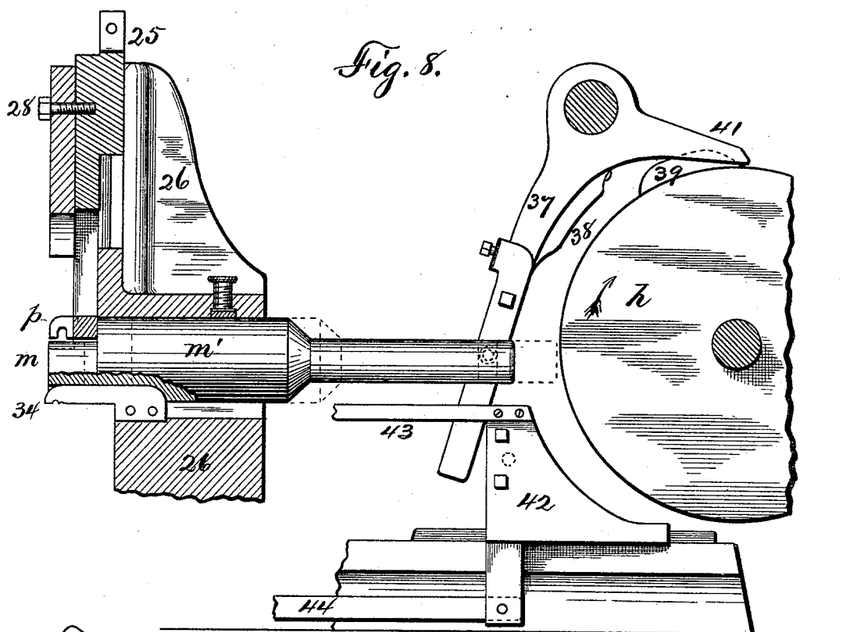
Fig. 8, is a detail in side elevation of the cam mechanism for reciprocating the winding mandrel and the tuckers.
Figure 9:
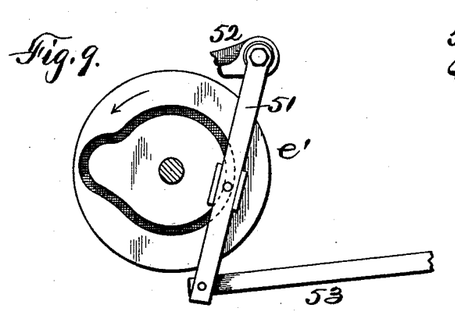
Figs. 9 and 10, are like views of the cams and rods operating the winders, respectively.
Figures 12, 13, 16, 17, 18, 19:
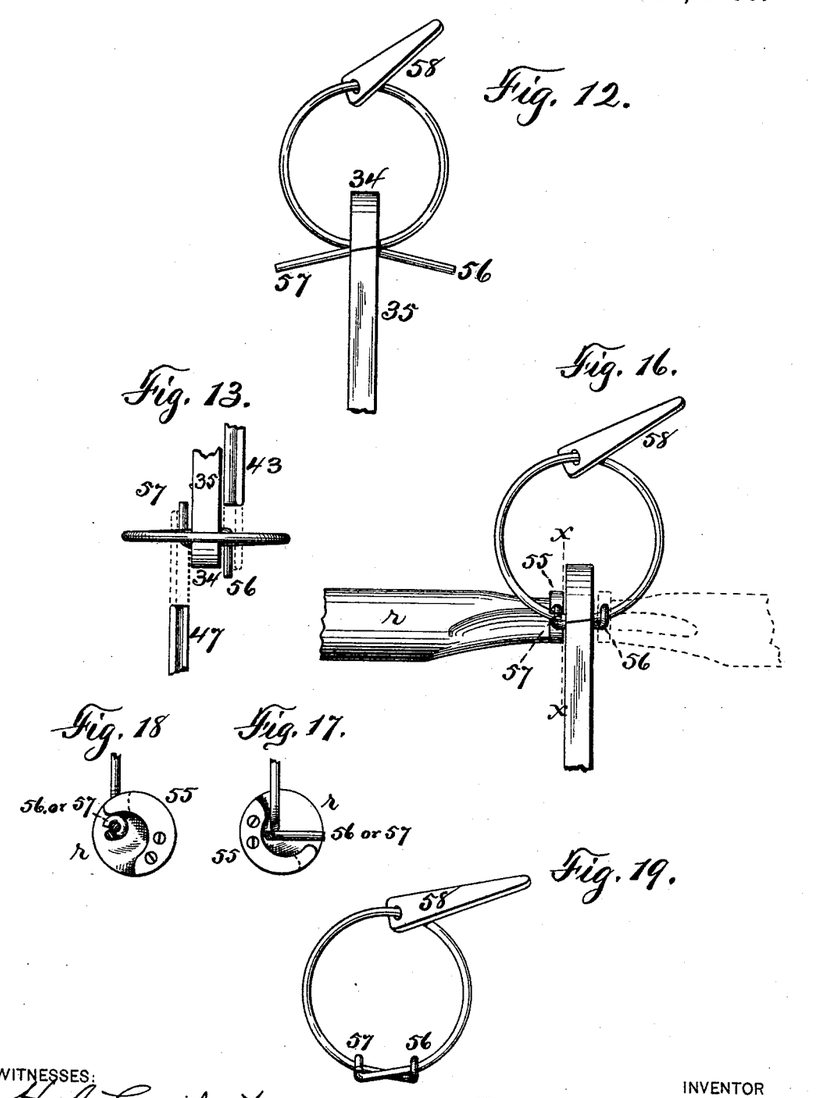
Fig. 12, is a detail showing the incomplete ring bent and gripped between the jaws.
Fig. 13, is a top plan detail of the ring with the ends tucked in opposite directions by the tuckers and the latter drawn back, their respective strokes being indicated by the dotted lines.
Fig. 16, is a front elevation of the ring, grip-jaw, and one winder, on the left, making the wind.
Fig. 17, is a sectional detail showing the cam on the winder ready to engage with a tucked end of the wire.
Fig. 18, is a like view of the same in the position it takes as the wind is completed.
Fig. 19, is a plan view of the ring complete.
Figure 14:
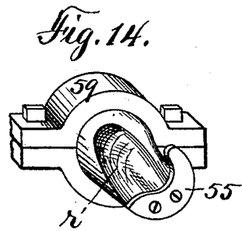
Fig. 14, is a plan perspective of the inner or working end of a winder.

The mandrel —m— is secured to a body —m′—, the rear end of which is connected to the angular lever —37— (Fig. 8) pivotally mounted, and provided with a lug —38—, with which the lug —39— upon the cam —h— is adapted to engage to force the mandrel outward into position for the formation of the incomplete ring; and then, as soon as it is so formed, and gripped and the fingers are retracted, the mandrel is retracted by the lug —40— on cam —h— (Fig. 6) coming into engagement with the arm —41— of the lever —37—, the dotted lines in Fig. 8 showing the movement of the mandrel body or shaft. Prior, however, to the retraction of the mandrel, as aforesaid, the tucking mechanism operates to bend the ends of the incomplete ring in opposite directions across the body, adjacent to the sides of the grip-jaws. This mechanism comprises the slide —42— (Fig. 8) mounted upon suitable ways, the tucker-bar —43— secured to its top and passing out beneath the mandrel through the standard —26—, and on one side of the stationary jaw; the connecting rod —44— connected at one end to said slide, and at the other to the lever —45— (Fig. 3) pivoted upon a standard —46— erected upon the bed, the upper end of which lever is connected to the other tucker —47—, mounted in ways upon said standard and so that when operated, its inner end will pass upon the opposite side of the grip jaws from the tucker —43— and engage with the other free end of the incomplete link, and bend it across the body of the ring in one direction while the other tucker bends the other end in the opposite direction (Fig. 13). These tuckers are retracted by the engagement of the lower end of the lever —37— (Fig. 8) with the slide —42— and simultaneously with the retraction of the mandrel as aforesaid; the slide being forced back, carrying with it the tucker —43— and reversing the movement of the connecting rod, lever and of the other tucker. This leaves the incomplete ring supported by the grip-jaws, and steadied by the lug or lugs —$p$—, and ready to have the ends wrapped or tied. This end wrapping mechanism comprises the grooved cams —$d$—, the pivoted levers —$d'$— having one end in engagement therewith, and their other ends each connected to a wrapping shaft —$r$— by means of a sleeve —48— loose upon said shaft, and a pin on said sleeve and a slot in said lever receiving said pin, leaving said shafts free to be rotated; a pinion —49— is mounted on each shaft by a feather or spline and key-way joint (Fig. 15) so that said shaft can slide freely through said pinion, and through its bearing on the standard —50—, when said cam is rotated; and the rotating mechanism consisting of the grooved cams —$e$—$e'$—, the lever —51— (Figs. 9 and 10) having one end pivoted in an arm —52— erected upon the bed, and immediately engaging with said cam, and its other end connected to the pitman —53— (Figs. 2, 9 and 10), the other end of which is connected to the pivotally mounted sector gear —54— which meshes with the pinion —49—, so that the rotation of a cam —$e$— (or —$e'$—) will rotate the wrapper shaft to which it is connected; and as these cams are set opposite to each other, the shafts will be rotated in opposite directions. The inner ends of these shafts are scarfed off substantially as shown, and provided upon their extremities, each with a wrapping cam —55— (see Fig. 4). Then when said shafts are moved inwardly, until the wrapping cams are contiguous to the grip-jaws, these cams will respectively engage with the ends —56— and —57—, previously tucked, and will, by their rotation, wrap, wind or coil and thus tie these ends to and around the body of the wire of the ring on each side of the grip jaws, and thus finish the ring.

In Figs. 12, 16 and 19 I show a spike —58— strung onto the ring, which is done by holding the spike in the groove between the lugs —$p$— above the mandrel —$m$— in such position that the wire is fed through the hole in said spike, and then the ring is finished as aforesaid. For some purposes such a spike is necessary to the ring, while for others it is not, in which latter cases it is omitted.

Figure 15:
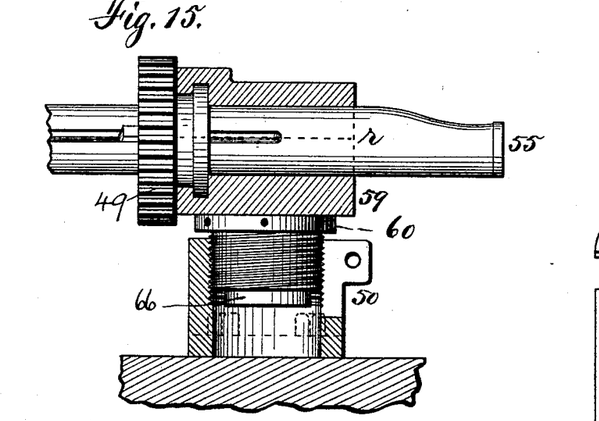
Fig. 15, is a sectional detail showing the winder in side elevation, and also its adjustable mounting.

In Figs. 4 and 15 I show the mounting of each winding shaft, consisting of a tubular nut —50— split vertically and provided with lateral ears adapted to receive a tightening bolt, a tubular screw —60— fitting in said tubular nut, and provided with a head adapted to receive a pin by which it is turned, and a tubular block 59 receiving the winder shaft and split horizontally and provided with lateral arms and tightening screw through them, and also having a vertical stem —66— fitting freely in the tubular screw, thereby pivoting said block thereon, regulating the tension upon the winder shaft, and also upon the adjusting screw —60— to prevent its slipping out of adjustment.

In Fig. 4 I show a block —61— adjustably mounted upon the face-plate, and provided with an adjustable stop-pin —62— against which the wire strikes, as it is fed into the machine.

Figure 1:
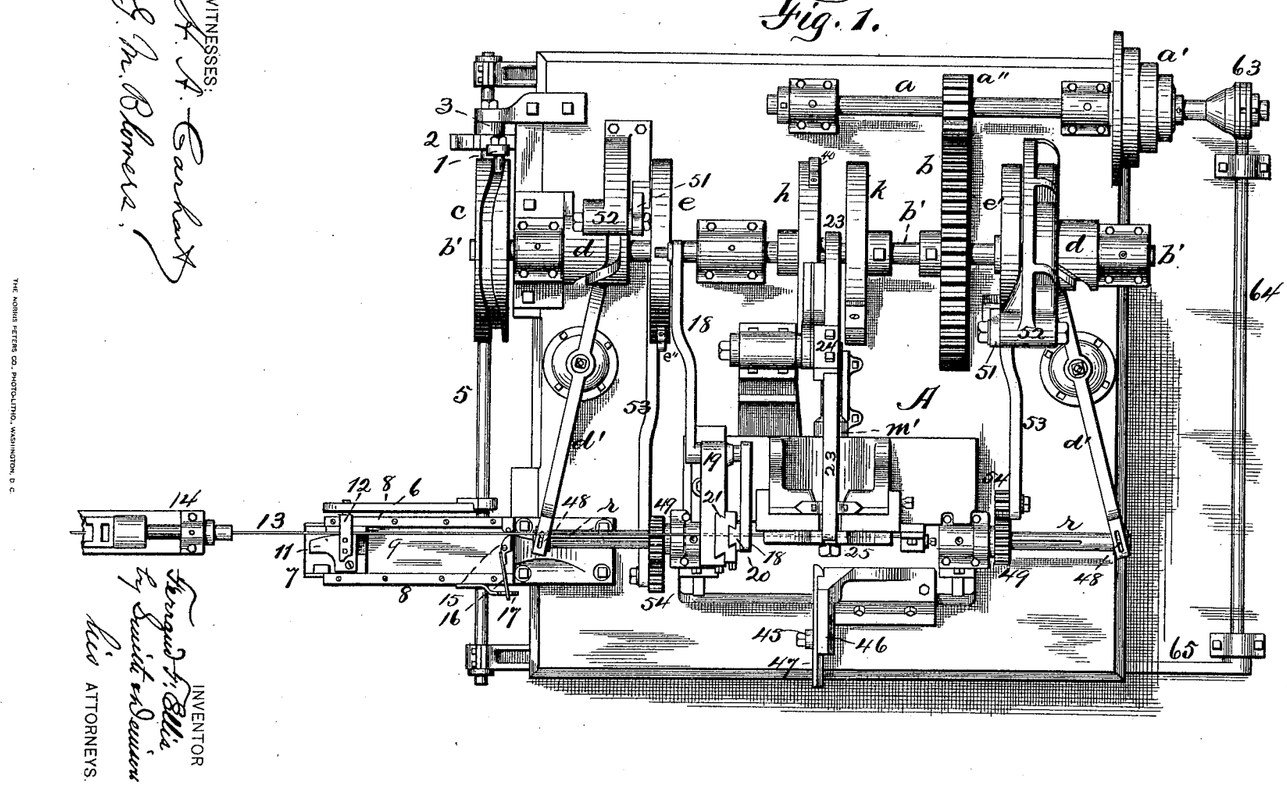
Figure 1 is a top plan of the machine complete.

In Fig. 1, on the right, I show an ordinary clutch —63—, a shaft —64— connected thereto, a crank arm —65— connected to said shaft, the other end of said crank arm being connected to a treadle (not shown) for the foot of the operator, and by means of which he can start or stop the machine, all being of ordinary construction.

No claim is herein made for the ring *per se*, constructed by the above described apparatus, for the reason that said ring is the subject-matter of another application for Letters Patent, filed October 8, 1892, Serial No. 448,195.

What I claim as my invention, and desire to secure by Letters Patent, is—

1. A wire feed, comprising a bed and ways thereon, a slide mounted therein, a grip-pawl pivoted upon said slide, an arm connected to said pawl, an oscillatory shaft carrying said arm, and means to oscillate it, in combination as set forth.

2. A bending mechanism comprising a cam, a lever pivotally mounted with which it engages, a vertically reciprocating slide connected to said lever, curved fingers mounted in curved seats and adapted to reciprocate therein and connected to said slide, in combination with a mandrel.

3. The combination with the mandrel, and the curved reciprocating fingers, of the lug —$p$— notched as shown, and the stationary jaw on the opposite side of the mandrel from the lug $p$.

4. The combination with the mandrel and the curved reciprocating fingers, of the stationary jaw below the mandrel and the vertically reciprocating jaw in alignment with the other jaw.

5. The combination, with the reciprocating mandrel, and the curved reciprocating fingers, of the lug above the mandrel, and the stationary jaw and the vertically reciprocating jaw below said mandrel.

6. The combination with the winder-shaft, of a cam and means to rotate it, a lever engaging therewith, a rod connected thereto and to a gear segment, and a pinion upon the winder-shaft in engagement with said gear segment.

7. The combination with the gripping jaws, of the reciprocating winder-shafts having cams upon their inner ends, a driving cam and means to rotate it, a lever engaging therewith, a rod connected to said lever and to a gear segment, and a pinion upon the winder shaft in engagement with said gear segment.

8. The combination, with the gripping jaws, and the lug above them, of reciprocating winder shafts provided with cams upon their inner ends, and means to rotate them in opposite directions.

9. The combination, with the winder shaft, of the split bearing block receiving it, and means to adjust the tension, the tubular adjusting screw in which the block is pivoted, and the split nut receiving said screw, and means to tighten said nut upon said screw.

10. The combination, with the winder shaft and the split bearing block therefor, pivotally mounted in a tubular screw, of the tubular split nut and the tubular adjusting screw therein, and means to adjust said bearing, tighten said nut, and rotate said screw.

In witness whereof I have hereunto set my hand this 22d day of October, 1892.

FERRAND F. ELLIS.

In presence of—
  C. S. JOSLYN,
  C. B. CRAGIN.